Patented Nov. 15, 1927.

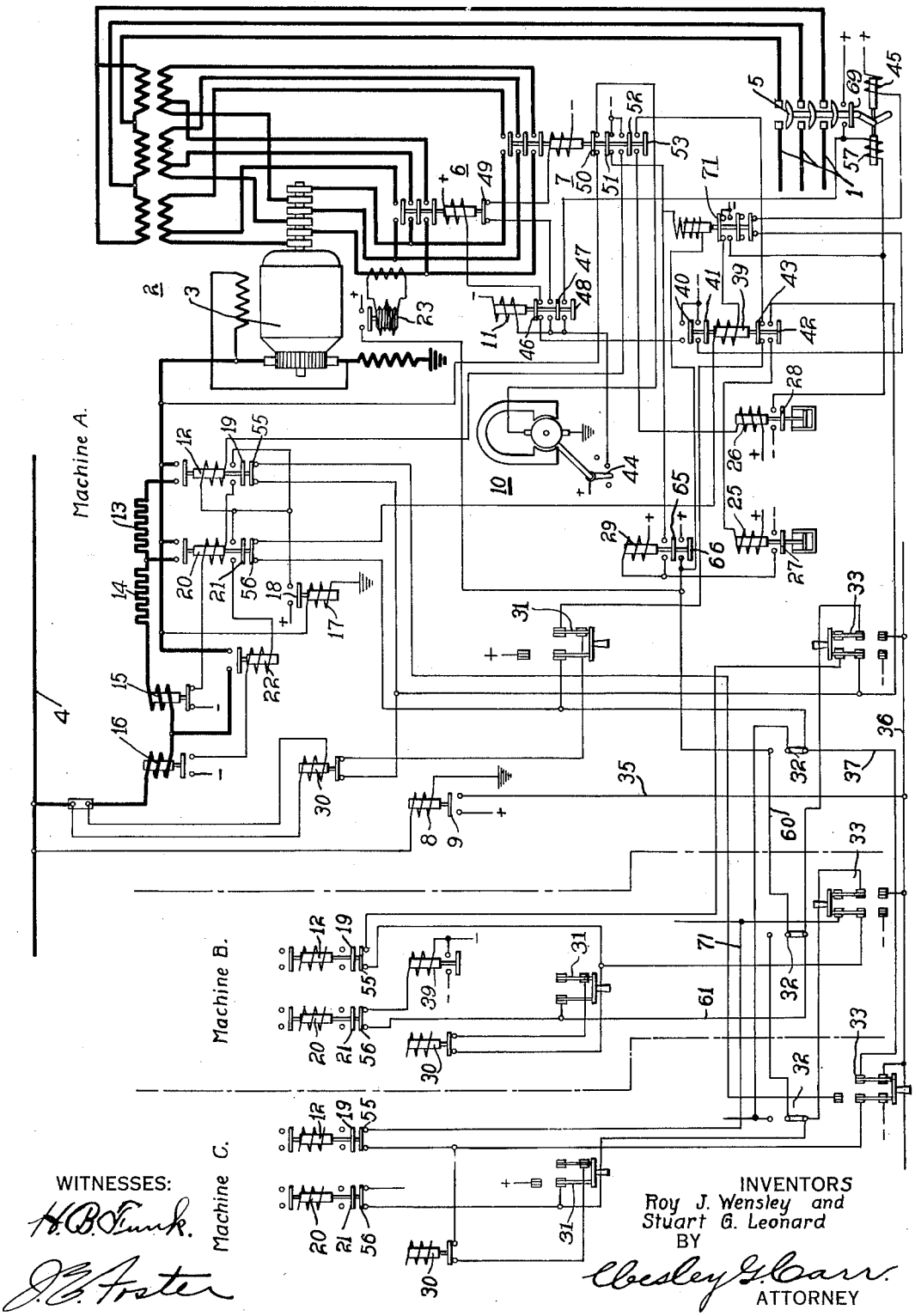

1,649,048

UNITED STATES PATENT OFFICE.

ROY J. WENSLEY, OF EDGEWOOD PARK, PENNSYLVANIA, AND STUART G. LEONARD, OF GALION, OHIO, ASSIGNORS TO WESTINGHOUSE ELECTRIC AND MANUFACTURING COMPANY, A CORPORATION OF PENNSYLVANIA.

TRANSFER SYSTEM FOR AUTOMATIC STATIONS.

Application filed August 15, 1922, Serial No. 581,941. Renewed September 21, 1927.

Our invention relates to automatic stations and particularly to transfer systems for the control of a plurality of converters in such stations.

One object of our invention is to provide means, in a system embodying a plurality of machines, for automatically connecting an additional machine to the load circuit of the system when the load on the system attains or exceeds a predetermined percentage of the rating of one machine.

Another object of our invention is to provide means, in a system of the above-indicated character, that shall control the connection of an additional machine to a load circuit in accordance with the temperature of an operating machine.

A further object of our invention is to provide means, in a system of the above-indicated character, that shall control the connection of a plurality of machines to the system in a predetermined sequence.

A still further object of our invention is to provide a system of the above-indicated character in which the control shall be automatically transferred from one machine to start a second machine if the first machine is not connected to the system within a predetermined interval of time.

A still further object of our invention is to provide a system in which the first machine shall be locked out if it is not connected to the system within a predetermined interval of time and the control automatically transferred to start a succeeding machine in a predetermined sequence.

Another object of our invention is to provide an arrangement of switching devices whereby the machines may be connected to the system in any predetermined sequence or some of the machines operated in a predetermined sequence automatically while one or more machines may be connected to the system subject to the will of an operator and rendered non-responsive to the various automatic controlling devices associated therewith.

Another object of our invention is to provide a system of the above-indicated character that shall be simple and economical in construction, and automatic and reliable in its operation.

Automatic substations have been employed to considerable extent in districts remote from a central generating station to supply direct-current energy to adjacent sections of a trolley system. In such substations, only one machine has been operated, since one machine had sufficient capacity to take care of any demand that might be made on the sections supplied by that machine. By reason of the increased cost of apparatus and of the manual operation thereof, it has been deemed desirable to also render direct-current generating stations in a congested district automatic.

The application of automatic apparatus to the control of more than one machine brings forth certain problems that may be encountered in such automatic operation. For example, when the load on an operating machine or on a plurality of operating machines attains a predetermined value, an additional machine should be connected to the system to help supply the energy demand. Also, if the starting and connecting apparatus of a machine fails to connect that machine to the circuit within a predetermined interval of time, another machine should be connected to the circuit to supply the demand thereon. Upon the occurrence of such a condition, under which the first machine is not connected to the system, it is deemed desirable to lock out that machine entirely from the system until an attendant may rectify the trouble that prevents the operation of the machine.

Under certain conditions, it may be desirable to permit the automatic operation of some of the machines and to preclude the automatic connection of one or more machines to the system to permit inspection of the machine and associated apparatus. Similarly, it may be desirable to operate one or more machines continuously and to render the associated apparatus non-responsive to the automatic controlling devices associated therewith.

Patent No. 1,435,229, issued Nov. 14, 1922, to F. C. Hanker and C. McL. Moss, and assigned to the Westinghouse Electric & Manufacturing Company, discloses a system for automatically controlling the operation of one machine in accordance with the demand for energy made on a load circuit.

In the present invention, we employ the system disclosed in the above patent for each machine. In addition, we provide means connected between the machines for controlling them in accordance with the condition of the previously-connected machines, in a predetermined sequence, and in accordance with the condition of the load circuit, which is supplied with energy by those machines.

Upon the occurrence of a demand for energy on the system, a machine is automatically started and connected to the load circuit to supply energy thereto. By means of selector switches severally associated with each machine, any machine may be made to start first when a demand is made on the system for energy.

When the first machine becomes overloaded or when its temperature attains a predetermined value, means are energized that automatically initiate the starting and connecting apparatus of a second machine in the predetermined sequence.

If, when the first demand for energy is made on the system, the first machine does not start within a predetermined interval of time, that is ordinarily sufficient to permit the connection of the machine to the system, means are energized to initiate the starting and connecting of the second machine to the system, and also to lock the first machine from the system until the fault therein, that prevented the connection, may be rectified.

We provide further an arrangement of switching devices whereby the control apparatus associated with the several machines may be caused to connect the machine to the system in a predetermined sequence. The switches are also arranged to permit the manual initiation of the control apparatus associated with the respective machines to connect the machines to the system and to maintain the same in operation subject to the will of an operator rather than to the fluctuations in the power demand.

The switching means are further arranged to permit the complete disconnection of the control apparatus from the automatic initiating devices to preclude the connection of the associated machine to the system.

The single figure of the accompanying drawing is a diagrammatic view of an electrical system embodying our invention.

In the system that is illustrated, alternating-current energy is received from an alternating-current circuit 1 through a plurality of power transformers 2 and transformed by a rotary transformer or synchronous converter 3 to direct-current energy which is then supplied to a direct-current circuit 4.

A main circuit interrupter 5 is provided to connect the power transformers 2 to the alternating-current circuit 1 and two switching devices 6 and 7 are provided to supply consecutively a reduced starting voltage and normal operating voltage from the transformers 2 to the alternating-current terminals of the converter 3.

Upon a demand for energy on the direct-current circuit 4, which is manifested by a decrease in the voltage of that circuit, a voltage relay or contact-making volt meter 8 is permitted to close its switch 9, whereupon a circuit is completed through a switching circuit, that will be hereinafter more fully described, whereby the various control devices of a predetermined machine are actuated to effect the connection of the machine to the system.

In the system, as illustrated, machine A will be the first to be connected between the circuits 1 and 4. When the demand for energy is manifested, the main circuit interrupter 5 will be closed to energize the transformers and the starting switch 6 will be closed to apply starting voltage to the converter. The converter will thereupon be accelerated to synchronous speed, whereupon chance polarity will be developed.

If the polarity is developed in a predetermined direction, a polarized relay 10, which is connected across the brushes of the converter during the starting operation, will energize a transfer relay 11 to effect the opening of the starting switch 6 and the closing of the running switch 7. Normal operating voltage is thereupon impressed upon the converter and the normal operating direct-current voltage generated at the direct-current end of the converter. The converter is then connected to the direct-current circuit 4.

If the polarity is developed in the opposite direction, a field-reversing switch is actuated, as described in the above-mentioned patent, which reverses the polarity of the converter, causing it to slip a pole and to redevelop the polarity in the correct direction. That particular arrangement whereby the incorrect polarity is reversed and the correct polarity developed does not constitute part of our invention, and, for the sake of simplicity, it is deemed to be sufficient here to assume the development of the correct polarity.

After the running switch 7 is closed and full operating voltage is applied to the converter 3, the converter is connected, by a switch 12, to the direct-current circuit through two resistor elements 13 and 14 and the operating coils of two series relays 15 and 16. This operation is accomplished as soon as the direct-current voltage attains a predetermined value, when a relay 17 operates to close its switch 18 to energize the operating coil of the direct-current switch 12. If a relatively large current traverses the coils of the relays 15 and 16 when the switch 12 is closed, these relays open their switches to preclude closing of switches 20 and 22, which short-circuit resistors 13 and 14, respectively.

The switch 12, when closed, closes an auxiliary interlock switch 19 that is connected in series with the operating coil of a switch 20, the switches of relays 15 and 17, and a source of control energy. When the current traversing the coil of the relay 15 falls to such value that this relay closes its switch, the operating coil of switch 20 is energized to cause this switch to be closed, thereby short-circuiting resistor 13. Switch 20, when closed, closes an auxiliary interlock switch 21 that is connected in series with the operating coil of a switch 22, the switches of relays 16 and 17, and the source of control energy. When the current traversing the coil of the relay 16 falls to such value that the switch of this relay is closed, the switch 22 is closed to short-circuit the resistor 14 and the coil of the series relay 15. The converter 3 is then connected directly to the circuit 4 with the current-limiting resistors 13 and 14 short-circuited.

In order to control the connection of an additional machine to the system when one or more operating machines become overloaded, a thermal relay 23 is provided that has an operating characteristic which corresponds substantially to the temperature characteristic of the associated machine. When the temperature of the machine attains a predetermined value indicating a predetermined load condition, the relay 23 closes its switch to complete a control circuit for the initiating apparatus associated with the next machine in the predetermined sequence.

Ordinarily, an interval of about fifteen to twenty seconds is sufficient to start a machine from rest to develop a correct polarity and connect it to the system. If any abnormal condition should preclude the connection of a machine to the system within a reasonably long interval of time, as, for example, one to one and one-half minutes, it is desirable to preclude the further energization and operation of the controlling means associated with that machine and to immediately effect the connection of a succeeding machine in a predetermined sequence to the system.

Two timing relays are provided for this purpose, embodying two switching devices 27 and 28 that are adapted to be closed if the associated operating coils 25 and 26, respectively, are continuously energized for a predetermined interval of time. The switch 27, for example, will close after an interval of one and one-half minutes and the switch 28 will close after an interval of, say, fifteen or twenty minutes.

The switch 27, when closed, energizes a relay 29 that serves to transmit a control impulse to the apparatus of the succeeding machine in the sequence to effect the connection of that machine to the system. The switching device 28 is controlled by a load relay 30 that is energized in accordance with the current supplied by the associated machine. The switching device 28, when closed, indicates a condition of substantially no-load demand and operates the main interrupter 5 to disconnect the machine from the system.

In order to operate the machine continuously, irrespective of the load upon the direct-current circuit, a double-throw switch 31 is provided which serves, when in its upper position, to render the load relay 30 and the time-element device 28 ineffective and also immediately to initiate the control apparatus to effect and maintain the connection of the converter to the system as long as it remains in this position. In its lower position, the switch 31 connects the load relay 30 to the control apparatus to permit the automatic control of such apparatus by the load relay 30 in response to the amount of energy delivered by the machine to the system.

A second manually-operable, single-pole, double-throw switch 32 is provided in order to isolate any machine from the system and to preclude the automatic connection thereof to the system upon an increased demand for energy, tending to overload the operating machine or machines. If it is desired that all of the machines be automatically controlled in a predetermined sequence, all of the switches 32 are closed in their lower positions. If it is desired, on the other hand, to isolate any machine from the sequence, its switch 32 is closed in the upper position to transfer the control to the next machine in the sequence. Any machine so isolated may be operated subject to the will of an operator in the station, however. Such operation is accomplished by means of the switch 31, as described above.

A third manually-operable, double-throw switch 33 is provided to control the sequence in which the machines may be automatically connected to the system.

The switches 33 of the machines A and B are closed on the upper side and the switch 33 of the machine C is closed on the lower side where the sequence in which the machines shall be connected to the circuit is A—B—C. That is, the switch 33 of the last machine in the sequence is closed on the lower side and the others on the upper side. Thus, were the sequence to be B—C—A, the switches 33 of machines B and C would be closed on the upper side and the switch 33 of machine A would be closed on the lower side.

Considering the sequence assumed, namely, A—B—C, the switches 33 will be closed in the positions illustrated, the switches 31 will be closed in the lower positions to permit automatic operation and the switches 32 will all be closed in the lower positions to permit the operation of all of the machines.

Assuming a demand for energy and the consequent decrease in the voltage of the direct-current circuit 4, relay 8 closes switch 9 whereupon a circuit is completed from positive terminal of a source of control energy through switch 9, conductor 35, conductor 36, switch 33 of machine C, conductor 37, interlock switch 56 of short-circuiting switch 20, operating coil of relay 39 and switch 71 of a lock-out relay 68 to negative terminal of the source of control energy. Relay 39 is thereupon actuated to close three interlock switches 40, 41 and 42 and to open an interlock switch 43.

Switch 41, cooperating with the normally closed switch 67 of lock-out relay 68, completes the circuit for energizing the closing coil 45 of the main circuit interrupter 5, thereupon connecting the transformers 2 to the alternating-current circuit 1. Switch 40, when closed, co-operates with a closed interlock switch 46 of the transfer relay 11 to complete the circuit of the operating coil of the starting switch 6 which closes to impress starting voltage on the converter.

The converter then develops its polarity, which may be assumed to be the correct polarity, whereupon the polarized relay 10 closes its switch 44 which completes the energizing circuit of the operating coil of the transfer relay 11. Relay 11 operates to open the switch 46 and to close two switches 47 and 48.

Switch 46, in opening, de-energizes the operating coil of the starting switch 6 which thereupon opens its main switches and closes an auxiliary interlock switch 49. The switch 47 of transfer relay 11 co-operates with switch 49, switch 48, and auxiliary switch 69 of the circuit-interrupter 5, to energize the operating coil of the running switch 7 which is thereupon closed to impress normal operating voltage upon the converter 3. Switch 48 of the transfer relay 11 serves also to co-operate with switch 69 to maintain the relay 11 energized. The operating coils of relay 11 and circuit interrupter 7 are therefore maintained in an energized condition as long as the circuit interrupter 5 remains closed.

Switch 7, when operated to closed position, opens two interlock switches 50 and 51 and closes switches 52 and 53. Switch 50, in opening, disconnects the polarized relay 10 from the converter. Switch 51, in opening, precludes cooperation thereof with switch 65 of the relay 29 to maintain energization of the operating coil of the relay 29. Relay 29 would effect the starting of another machine if machine A should not be connected to the system within the predetermined interval of one and one-half minutes. This operation will be described in detail presently.

As soon as the main switch 7 impresses normal operating voltage on the converter, the direct-current voltage gradually increases until a predetermined voltage is attained that is sufficient to operate the voltage relay 17 to close its switch 18. The circuit of the operating coil of the switch 12 is thereupon completed by the switch 18 in co-operation with the interlock switch 52 of the running switch 7. The converter is then connected directly to the direct-current circuit 4, as previously explained.

The switch 20, when closed, opens an interlock switch 56. The switch 56, when open, de-energizes the circuit of the relay 39. The switch 41 of relay 39 thereupon opens and de-energizes the closing coil 45 of the main interrupter 5 which remains closed, however, since it is of the latching type.

The switch 43, of relay 39, when closed, cooperates with the interlock switch 53, of running switch 7, which is, at this time, closed, and with the operating coil of the switching device 28 of the timing relay to permit the energization of the operating coil if the current supplied to the converter by the converter should decrease to a predetermined value at which the switch of the load relay 30 would be closed.

If such condition of relatively no load should be maintained for the time interval for which the switch 28 is adjusted, the switch 28 would close, thereby cooperating with auxiliary switch 69 of the circuit interrupter 5 to energize the trip coil 57, whereupon the main switch 5 would be opened to disconnect the converter from the circuit 1.

If machine A should become overloaded, thermal relay 23 would close its switch to complete a circuit from positive terminal of the control source through conductor 60, switch 32 of machine B in the lower position, conductor 61, switch 56 of the switch 20 of machine B and relay 39 associated with the machine B to the negative terminal of the control source. Relay 39, that is associated with machine B, will thereupon be actuated to initiate the control apparatus associated with the machine B to effect the connection of that machine to the system.

If the load should further increase, the thermal relay associated with machine B would similarly control the energization of the initiating relay, associated with machine C, to effect the connection of machine C to the system.

It is desired, when the load decreases, to disconnect the machines from the system in a reverse sequence relative to that of their connection. When the load decreases to a predetermined value, which may be supplied by machines A and B, the load relay 30, that is associated with machine C, will close. The timing relay coil 26 of machine C will thereupon be energized to effect the operation of the long time-element switching device 28 to disconnect the machine C from the system.

In case machine C is to be disconnected from the system, the control circuit for the time-element relay proceeds from negative terminal of the control source through the switch 33 of machine C, the load relay 30, switch 31, switch 43 of relay 39, switch 53 of running switch 7 and the operating coil 26 of the time-element relay to the positive terminal of the control source.

When machine B is to be disconnected from the system, the circuit proceeds from the negative terminal of the control source through the switch 33 of machine C, interlock switch 55 of machine C, switch 33 associated with machine B, and thence through the remaining switches, as outlined in the previous paragraph, to effect the disconnection of machine B.

When one machine in the sequence fails to start or is not connected to the system within the predetermined interval of time allowed, as, for example, one and one-half minutes, its time-element switching device 27 operates to energize the relay 29, whereupon the apparatus associated with the succeeding machine in the predetermined sequence is controlled to effect the connection of the associated machine to the system.

This circuit may be traced from the positive terminal of the control source through the operating coil 25 of the switching device 27, switch 42 of the initiating relay 39, switch 33, associated with machine A, conductor 70, interlock switch 55 of switch 12 associated with machine B, switch 33 of machine B, conductor 71, interlock switch 55 of switch 12 associated with machine C and switch 33 of machine C to the negative terminal of the control source. The switching device 27 is thereupon closed after an interval of one and one-half minutes to energize the relay 29 which closes its two switches 65 and 66.

Switch 65 co-operates with switch 51 of the running switch 7 to maintain the relay 29 energized and switch 66 serves to complete a circuit for energizing the initiating relay 39 that is associated with machine B to effect the connection of machine B to the system. Switch 66 is connected in parallel relation with the thermal relay switch 23 so that either overload condition in machine A or an abnormal condition, that prevents the connection of machine A to the system, will serve to effect the connection of machine B to the system.

By means of the thermal relay 23 and the time-element switching device 27, we are able to procure the automatic starting of a second machine when overload or other abnormal conditions occur in the first machine.

If the relay 29 is energized because of failure to connect the first machine to the system within the predetermined interval of time, switch 66 of relay 29 cooperates with auxiliary switch 51 of the circuit interrupter 7 to energize the operating coil of the lock-out relay 68. The relay 68 thereupon closes its switch 70 to energize the tripping coil 57 to trip out the circuit interrupter 5 and opens its switch 67 to preclude energization of the closing coil 45. The first machine is therefore locked out of service until the relay 29 is manually returned to its normal condition and until the abnormal condition that caused the energization of the relay 29 is removed.

When the operating coil of lock-out relay 68 is energized, this relay opens a third switch 71 that is connected in series with the operating coil of the initiating relay 39. Energization of the operating coil of the relay 39 is therefore precluded while the lock-out relay 68 is energized. Energization of the operating coils of the relay 11 and the circuit interrupter 7 is precluded by the opening of the auxiliary switch 69 of the circuit interrupter 5. Thus it will be seen that while the lock-out relay of any machine is energized, energization of any of the other controlling means of that machine is precluded.

By means of the various manually-operated switches, we are able also to selectively establish a predetermined sequence in which the machines may be connected to the system.

Our invention is not limited to the specific structure or arrangement of the switching devices, since modifications may be made therein within the spirit and scope of our invention, as set forth in the appended claims.

We claim as our invention:

1. In an electrical system, the combination with a load circuit, a plurality of dynamo-electric machines and apparatus automatically initiated and controlled in predetermined sequence for severally starting and connecting the machines to the load circuit in accordance with a demand thereon for energy, of means energized upon the initiation and operation of the connecting apparatus for rendering the same ineffective if the selected machine is not connected to the circuit within a predetermined interval of time and for initiating the starting and connecting apparatus of another machine to connect that machine to the load circuit and means for controlling the selection, or the sequence of selection, of the other machines.

2. In an electrical system, the combination with a load circuit, and a plurality of sources of electrical energy, of means for connecting one source of energy to the circuit when a predetermined demand for energy occurs, automatic means for severally connecting the additional sources to the circuit when the load on the connected source, or sources, exceeds a predetermined percentage of the normal full-load capacity thereof, means for predetermining the sequence in which the sources of energy shall be connected to the load circuit and manually operable means for causing any source or sources to be omitted from the sequence.

3. In an electrical system, the combination with an electric circuit and a plurality of dynamo-electric machines to supply the load thereon, of automatic means for severally connecting the machines to the circuit in accordance with the power demand on the circuit, means for predetermining the sequence of connection of the machines to the circuit, and manually operable means for causing any machine or machines to be omitted from the sequence.

4. In an electrical system, the combination with an electric circuit and a plurality of dynamo-electric machines to supply the load thereon, of automatic means for severally connecting the machines to the circuit in accordance with the power demand on the circuit and a plurality of manually operable switches for predetermining the sequence of connection of the machines to the circuit and for causing any machine or machines to be omitted from the sequence.

5. In an electrical system, the combination with a load circuit and a plurality of dynamo-electric machines for supplying energy thereto, of means for automatically starting and connecting the several machines to the load circuit in accordance with the load demand thereon and a plurality of switches associated with each machine for predetermining the position of that machine in a preferred sequence of connection to the load circuit, for causing any machine or machines to be omitted from the sequence, and for rendering the machine or machines so omitted subject to operation independent of the machines in the sequence.

6. In an electrical system, the combination with a load circuit and a plurality of dynamo-electric machines for supplying energy thereto, of means for automatically starting and connecting the several machines to the load circuit in accordance with the load demand thereon and a manually-operated switch associated with each machine for controlling the position of that machine in a preferred sequence of connection to the load circuit.

7. In an electrical system, the combination with a load circuit and a plurality of dynamo-electric machines for supplying energy thereto, of means for automatically starting and connecting the several machines to the load circuit in accordance with the load demand thereon and means associated with each machine for predetermining the position of that machine in a preferred sequence, for precluding automatic operation of that machine, and for rendering that machine subject to the control of an operator.

8. In an electrical system, the combination with a plurality of machines for translating energy between two portions of the system, of means associated with each machine for controlling the automatic connection of the machine to the system, means whereby the automatic connection and disconnection of the machines to and from the system may be effected in a predetermined sequence, and means for causing any machine or machines to be omitted from the predetermined sequence and for rendering the machine or machines so omitted subject to the control of an operator.

9. The combination with an electrical system and a plurality of translating devices to be connected thereto, of means for automatically effecting such connections, and manually operable switching means for predetermining the sequence of selection of the translating devices and for causing any machine or machines to be omitted from the predetermined sequence of selection.

10. The combination with an electrical system and a plurality of translating devices to be connected thereto, of means for automatically effecting such connection, means for establishing a preferred sequence of selection of the devices, and switching means for selectively removing any one of the devices from the sequence of automatic operation either to preclude operation of that translating device or to manually initiate the connection of the device to the system and to render the device non-responsive to the control of the automatic connecting means.

In testimony whereof, we have hereunto subscribed our names this 10th day of August, 1922.

ROY J. WENSLEY.
STUART G. LEONARD.